United States Patent [19]

Seymour et al.

[11] Patent Number: 4,765,705
[45] Date of Patent: Aug. 23, 1988

[54] GRATING SURFACE PLASMON COUPLER

[75] Inventors: Robert J. Seymour, Wellesley, Mass.; George I. Stegeman, Tucson, Ariz.

[73] Assignee: GTE Laboratories Incorporated, Waltham, Mass.

[21] Appl. No.: 474,222

[22] Filed: Mar. 11, 1983

[51] Int. Cl.⁴ .......................... G02B 6/26; G02B 5/18; G02B 6/34

[52] U.S. Cl. .............................. 350/96.15; 350/96.19; 350/162.17

[58] Field of Search ................. 350/1.1, 162.2, 162.11, 350/162.17, 96.15, 96.17, 96.19

[56] References Cited

U.S. PATENT DOCUMENTS 4,432,614  2/1984  McNeill et al. ..................... 350/386

FOREIGN PATENT DOCUMENTS 0019550  2/1977  Japan ..................... 350/96.19

Primary Examiner—William L. Sikes
Assistant Examiner—Akm E. Ullah
Attorney, Agent, or Firm—Fred Fisher

[57] ABSTRACT

Devices for efficiently coupling electromagnetic radiation in the far infrared and sub-millimeter microwave regions of the electromagnetic spectrum to surface electromagnetic waves comprise a material of negative dielectric constant having a grating contoured surface overcoated with a transparent organopolymeric material. The efficiency of coupling between the free radiation and the surface electromagnetic waves can be optimized by adjusting the thickness of the overcoating layer.

11 Claims, 1 Drawing Sheet

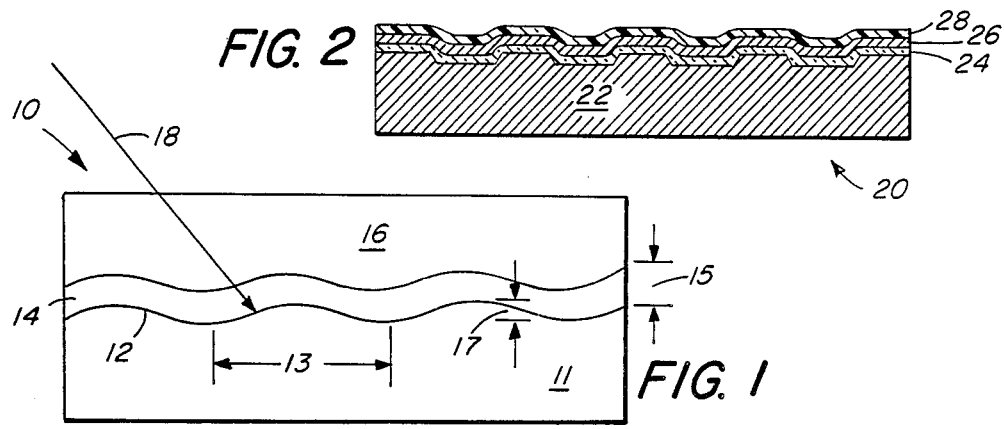
FIG. 2
FIG. 1
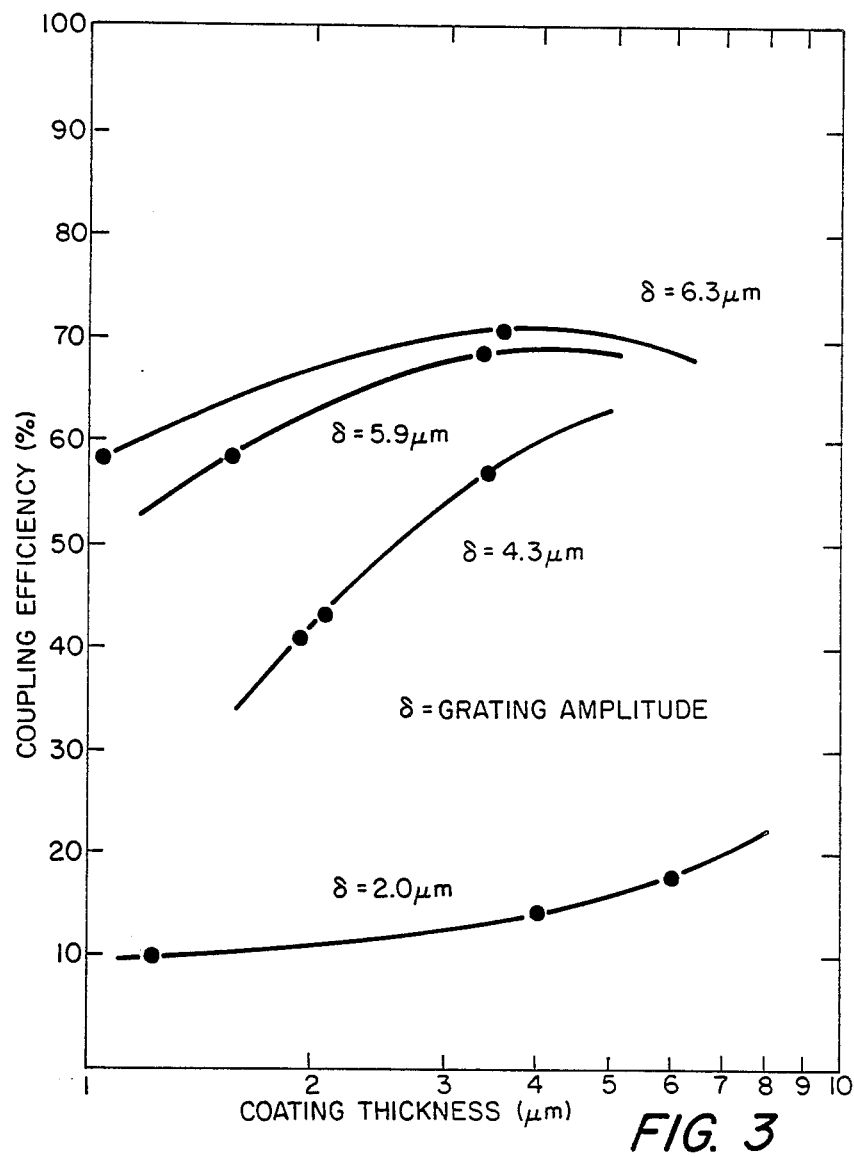
FIG. 3

GRATING SURFACE PLASMON COUPLER

BACKGROUND OF THE INVENTION

The present invention is related to optical devices. More particularly, it is concerned with overcoated grating couplers for use in coupling free electromagnetic radiation to surface electromagnetic waves generated in the grating.

It is well known that in the visible region of the electromagnetic spectrum it is possible to couple essentially all of the bulk electromagnetic wave incident to a metal surface into a surface electromagnetic wave (SEW) or surface plasmon wave within the metal. (For a detailed discussion of surface plasmons see, for example, E. Burstein et al., *J. Vac. Sci. Technol.*, Vol. 11, No. 6, pp. 1004–1019, 1974.)

However, as the wavelength of the incident radiation increases into the infrared region of the spectrum and beyond, efficient coupling between the incident radiation and the surface plasmon becomes more difficult. This is due to increasing delocalization of the electromagnetic field away from the interface and the corresponding decrease in the proportion of the field within the metal as wavelength increases.

Z. Schlesinger et al. have discussed in *Solid State Commun.* Vol. 38, pp. 1035–1039, 1981, the phenomenon of coupling between far infrared radiation and surface plasmons in germanium coated gold or lead surfaces. In a doctoral dissertation submitted to the University of Missouri at Rolla in 1975 and entitled, "Excitation of Surface Electromagnetic Waves at Microwave Frequencies Using Optical Techniques," M. Davarpanah has described the coupling of microwave radiation into a coated metal surface in devices which employ metal rods placed over the coating.

OBJECTS AND SUMMARY OF THE INVENTION

It is therefore an object of the present invention to provide a device which efficiently couples electromagnetic radiation in the far infrared and sub-millimeter regions of the spectrum with surface plasmon waves on a metal.

It is a further object of the invention to provide such a device which is easily and inexpensively fabricated.

It is yet another object of the present invention to provide devices for coupling electromagnetic radiation into surface electromagnetic waves, which devices can be effectively fabricated in small size by techniques known in the semiconductor arts.

These and further objects and advantages are achieved by providing in accordance with the present invention devices comprising a portion of a first material of negative dielectric constant having a grating contoured surface and a thin layer of a second material having a positive dielectric constant overlying the first material. The thin layer of second material is of a material transparent to the electromagnetic radiation. A third material of positive dielectric constant less than that of the second material contacts the thin layer of second material.

The period of the grating contoured surface is preferably greater than the wavelength of the electromagnetic radiation in the third material. The energy of electromagnetic radiation in the third material which is incident to the interface between the first and said second material is transformed with an efficiency greater than about 50 percent into surface electromagnetic waves generated in the first material.

BRIEF DESCRIPTION OF THE DRAWING

FIG. 1 is a schematic representation of surface plasmon grating coupling devices in accordance with the present invention.

FIG. 2 is a schematic representation of one embodiment of a surface plasmon grating coupler in accordance with the present invention.

FIG. 3 is a graph illustrating the relationship between coating thickness on surface plasmon coupling devices of the present invention and the efficiency of coupling.

For a better understanding of the present invention, together with other and further objects, advantages and capabilities thereof, reference is made to the following disclosure and appended claims in connection with the above-described drawing figures.

DETAILED DESCRIPTION

Coated grating surface plasmon wave coupling devices of this invention are useful for coupling electromagnetic radiation (EMR), particularly in the far infrared or sub-millimeter microwave regions of the electromagnetic spectrum, into surface plasmon waves in the device. Devices of this invention comprise a material of negative dielectric constant, the surface of which has been contoured into a grating structure. Metals such as aluminum, nickel, copper, zinc, palladium, silver, cadmium, platinum, gold, and mixtures or alloys of these metals are effective. The grating surface preferably has a repeating structure with a periodicity greater than the wavelength of the EMR in the third material or medium. The amplitude or depth of the grating structure on the metal surface for electromagnetic radiation in the far infrared region is preferably less than about one-quarter wavelength of the EMR.

Standard techniques are employed for producing the grating structure in the metallic surface. For instance, in the examples described in detail below, a silicon wafer was etched by techniques known in the semiconductor arts to produce a grating contoured surface on the silicon. The grating etched surface was then coated with a thin layer of phosphorous glass. A metallic layer of silver was deposited over the glass using vacuum evaporative techniques to produce a metal grating surface.

The metal grating surface is coated with a dielectric material, transparent to the EMR of interest, in order to optimize coupling efficiency between the EMR and surface plasmon waves generated in the metal grating. The dielectric material should have a low absorption extinction coefficient (preferably less than about 1 cm$^{-1}$) in the spectral region of the radiation to be coupled.

Preferred dielectric coatings for grating coupling devices in accordance with this invention are organopolymers which are transparent to far infrared or sub-millimeter microwave EMR. Particularly preferred dielectric coating materials include saturated hydrocarbon or halogen substituted saturated hydrocarbon polymers. Most preferred materials are such polymeric materials as polyethylene, polytetrafluoroethylene, polyisobutyl ethylene (TPX ® Mitsui Petrochemical Ltd.), and the like.

The thickness of the dielectric overcoating applied to the metal grating surface for optimum coupling efficiency varies with a number of parameters including the wavelength of EMR to be coupled, the grating period and amplitude, and the diameter of the beam of electromagnetic radiation played upon the grating surface. The complex relationship between these parameters is presented in "Far-Infrared Surface Plasmon Coupling with Overcoated Gratings," by R. J. Seymour, E. S. Koteles, and G. I. Stegemen in *Appl. Phys. Letters* 41(11), pp. 1013–1015, Dec. 1, 1982, incorporated herein by reference.

Referring to FIG. 1, there is shown in schematic representation a grating coupler 10 in accordance with the present invention. A material 11 of negative dielectric constant, such as a metal, has a grating contoured surface 12. The grating contoured surface 12 preferably has a period (represented by 13) greater than the wavelength of the free photon beam 18 to be coupled into the material 11. The amplitude of the grating contoured surface (represented by 17) is small in comparison to the grating period.

A coating layer 14 of positive dielectric constant covers the grating contoured metal surface 12. The thickness of the coating layer 14 is likewise thin, preferably less than one-quarter wavelength of the EMR to be coupled into the metal grating.

A material 16 of positive dielectric constant but less than that of the coating layer 14 is over the coating layer. In one embodiment of the invention, this layer of material 16 is air or a vacuum, in which case the device consists of a dielectric coated grating contoured metal surface alone. In other embodiments, the material 16 may comprise any material transparent to the wavelengths of the EMR to be coupled into the metal surface. In the latter case, the period of the grating contoured surface of the metal should be greater than the wavelength of the EMR in the material.

EXAMPLES

Several overcoated surface plasmon grating couplers having different grating amplitudes were fabricated and the efficiency of coupling between a beam of photons incident to the grating and surface plasmon waves generated within the grating was measured for each coupler as a function of overcoating thickness.

The structure of the coated grating coupler devices employed in these examples is represented schematically in FIG. 2. In each example, a silicon wafer 22 was etched by methods well known to the semiconductor arts. The silicon wafer 22 was coated with a photoresist and then exposed to an alternating clear/opaque parallel bar mask. The exposed resist pattern was developed and the resulting masked wafer anisotropically etched to produce a surface grating having a repeating grating contour with a periodicity of 152.4 microns. The grating contoured surface had a generally trapezoidal cross-section. The surface of the etched silicon wafer 22 was cleaned and coated with a thin layer of phosphorus glass 24. The glass coated grating was placed in an oven and heated to the softening point of the glass to cause the glass layer to flow slightly to round the edges of the grating pattern.

The glass coated grating was then coated by vacuum evaporation techniques with a thin layer of silver 26 of about 0.4 microns thickness to form a metal grating overlying the surface of the glass layer 24. A coating 28 of polyethylene was applied to the silver grating by hot spin coating a solution of polyethylene in xylene at about 100° C. on the metal grating surface. Various polyethylene coating thicknesses up to about 6 micrometers were applied to gratings made by the method detailed above.

The efficiency of coupling between a photon beam of 118.8 micrometers wavelength incident to the grating surface and surface plasmon waves generated within the grating were measured for each coating thickness. The coupling efficiency was measured using the standard attenuated total reflectance technique. No correction was made for second order diffraction losses which were measured to be small for our low amplitude gratings. The source was a commercial, dielectric waveguide, optically pumped, far-infrared laser operated on the 118.8 micron methanol laser line. The output of the laser was linearly polarized and the orientation of the electric vector was changed during the course of the experiment by the introduction of a half-wave plate into the $CO_2$ laser pump beam to insure that there was coupling to the surface plasmon the TM surface mode (which requires a p polarization beam.)

The sample was mounted on the rotation axis of a modified x-ray goniometer. A pyroelectric detector was mounted on the goniometer arm which tracked the reflected beam as the sample was rotated. A second pyroelectric detector was used as a reference detector to compensate for fluctuations in the laser amplitude. The laser beam was chopped at 80 Hz and the detector outputs were demodulated with two lock-in amplifiers. The ratio of the amplifier outputs was recorded on a strip chart recorder.

The laser beam was collimated and apertured to produce a rectangular image, 2 cm in length. The collimated beam was played upon the grating surface in such a manner that the 2 cm dimension of the beam image was perpendicular to the grating ruling.

The results of these experiments are presented in the accompanying Table. The agreement between the experimentally observed values for coupling and calculated theoretical values was quite good.

TABLE

| Example | Grating Period ($\mu m$) | Grating Amplitude ($\mu m$) | Overcoating Thickness ($\mu m$) | Coupling Efficiency (Percent) |
|---|---|---|---|---|
| I | 152.4 | 6.3 | 1.1 | 59 |
| II | 152.4 | 6.3 | 3.6 | 71 |
| III | 152.4 | 5.9 | 1.7 | 59 |
| IV | 152.4 | 5.9 | 3.3 | 69 |
| V | 152.4 | 4.3 | 1.9 | 41 |
| VI | 152.4 | 4.3 | 2.1 | 43 |
| VII | 152.4 | 4.3 | 3.4 | 57 |
| VIII | 152.4 | 2.0 | 1.2 | 10 |
| IX | 152.4 | 2.0 | 4.0 | 14 |
| X | 152.4 | 2.0 | 6.0 | 18 |

The data given in the Table have been plotted in FIG. 3. Examination of FIG. 3 shows that under the given conditions of grating period and amplitude, and for the wavelength of light used, the optimum thickness of the coating on the grating for maximum coupling between the incident photon beam and the surface plasmon waves depends upon the amplitude of the grating. For the larger values of grating amplitude, higher coupling efficiencies are obtained with thinner grating overcoatings.

While there have been shown and described what are at present believed to be the preferred embodiments of the present invention, it will be obvious to one skilled in the art that various changes and modifications may be made therein without departing from the scope of the invention as defined by the appended claims.

What is claimed is:

1. A device for coupling electromagnetic radiation to surface electromagnetic waves comprising:
   a portion of a first material of negative dielectric constant having a grating contoured surface;
   a thin layer of a second material having a positive dielectric constant and transparent to said electromagnetic radiation, said thin layer of said second material overlying said grating contoured surface;
   said thin layer of said second material being in contact with a third material having a positive dielectric constant less than that of said second material;
to transform the energy of said electromagnetic radiation in said third material with an efficiency greater than about 50 percent into surface electromagnetic waves in said first material.

2. A device in accordance with claim 1 wherein the period of said grating contoured surface is greater than the wavelength of said electromagnetic radiation in said third material.

3. A device in accordance with claim 1 wherein said layer of said first material comprises a metal.

4. A device in accordance with claim 3 wherein said layer of metal is selected from the group consisting of aluminum, nickel, copper, zinc, palladium, silver, cadmium, platinum, gold, and mixtures and alloys thereof.

5. A device in accordance with claim 1 wherein said thin layer of said second material comprises an organopolymer material.

6. A device in accordance with claim 5 wherein said organopolymer material is selected from the group consisting of polyethylene, polytetrafluoroethylene, and polyisobutylethylene.

7. A device in accordance with claim 5 wherein the thickness of said thin layer of said second material is less than $\frac{1}{4}$ wavelength of said electromagnetic radiation in said second material.

8. A device for coupling electromagnetic radiation to surface electromagnetic waves comprising:
   a layer of a metal having a grating contoured surface;
   a thin layer of an organopolymer having a positive dielectric constant and transparent to said electromagnetic radiation, said thin layer of said organopolymer overlying said grating contoured surface;
   said thin layer of said organopolymer in contact with a third material having a positive dielectric constant less than that of said organopolymer;
to transform the energy of said electromagnetic radiation in said third material with an efficiency greater than about 50 percent into surface electromagnetic waves in said metal.

9. A device in accordance with claim 8 wherein said metal is selected from the group consisting of aluminum, nickel, copper, zinc, palladium, silver, cadmium, platinum, gold, and mixtures and alloys thereof.

10. A device in accordance with claim 8 wherein said organopolymer is selected from the group consisting of polyethylene, polytetrafluoroethylene, and polyisobutylethylene.

11. A device in accordance with claim 10 wherein the thickness of said thin layer of said organopolymer is less than $\frac{1}{4}$ wavelength of said electromagnetic radiation in said organopolymer.

* * * * *